United States Patent
Kalinin

(10) Patent No.: US 7,795,779 B2
(45) Date of Patent: Sep. 14, 2010

(54) SAW TORQUE AND TEMPERATURE SENSOR

(75) Inventor: Victor Alexandrovich Kalinin, Headington (GB)

(73) Assignee: Transense Technologies plc (GB)

( * ) Notice: Subject to any disclaimer, the term of this patent is extended or adjusted under 35 U.S.C. 154(b) by 59 days.

(21) Appl. No.: 11/920,678

(22) PCT Filed: Mar. 2, 2006

(86) PCT No.: PCT/GB2006/000739
§ 371 (c)(1),
(2), (4) Date: Nov. 19, 2007

(87) PCT Pub. No.: WO2006/123085
PCT Pub. Date: Nov. 23, 2006

(65) Prior Publication Data
US 2009/0133504 A1    May 28, 2009

(30) Foreign Application Priority Data
May 20, 2005    (GB) .............................. 0510326.2

(51) Int. Cl.
*H03H 9/25* (2006.01)
(52) U.S. Cl. .................... 310/313 R; 333/193; 310/341
(58) Field of Classification Search ................. 310/313, 310/313 R, 341; 333/193
See application file for complete search history.

(56) References Cited

U.S. PATENT DOCUMENTS

| | | | | |
|---|---|---|---|---|
| 3,889,205 A | * | 6/1975 | Mitchell | 331/41 |
| 5,585,571 A | * | 12/1996 | Lonsdale et al. | 73/862.325 |
| 5,952,899 A | * | 9/1999 | Kadota et al. | 333/193 |
| 6,571,638 B2 | * | 6/2003 | Hines et al. | 73/702 |
| 7,000,298 B2 | * | 2/2006 | Cook et al. | 29/25.41 |

(Continued)

FOREIGN PATENT DOCUMENTS

DE    100 54 198    9/2001

(Continued)

OTHER PUBLICATIONS

Wolff et al., Radio Accessible SAW Sensors for Non-Contact Measurement of Torque and Temperature; IEEE Ultrasonics Symposium; 1996; pp. 359-362.

(Continued)

*Primary Examiner*—Walter Benson
*Assistant Examiner*—Bryan P Gordon
(74) *Attorney, Agent, or Firm*—Keusey & Associates, P.C.

(57) ABSTRACT

A contactless SAW based torque and temperature sensor includes three SAW resonators 2, 3, 4 mounted on a common substrate 1 made of Y+34° cut of quartz. The first SAW 2 has its principle axis inclined at +45° to the X-axis of the substrate, which, in use, is either aligned with the longitudinal axis of a device whose torque is to be measured or is perpendicular thereto, and the second SAW 3 has its principle axis inclined at 135 degrees to the X-axis of the substrate. The third SAW 4 is positioned with its principle axis inclined at an angle, preferably in the range of 0 to 30 degrees, to the principle axis of both the first 2 and second 3 resonators so that none of the SAWs are parallel, the third SAW 4 enabling temperature measurements to be taken.

15 Claims, 3 Drawing Sheets

U.S. PATENT DOCUMENTS

2004/0216526 A1* 11/2004 Cook et al. .................. 73/708
2005/0001511 A1* 1/2005 Kalinin et al. .......... 310/313 A
2006/0130585 A1* 6/2006 Magee et al. ................. 73/570

FOREIGN PATENT DOCUMENTS

GB 2381069 4/2003
GB 2386684 9/2003
WO WO 97/09596 3/1997

OTHER PUBLICATIONS

Buff et al., Universal Pressure and Temperature SAW Sensor for Wireless Applications; IEEE Ultrasonics Symposium; 1997; pp. 359-362.

* cited by examiner

SAW TORQUE AND TEMPERATURE SENSOR

BACKGROUND OF THE INVENTION

1. Field of the Invention

The present invention relates to SAW based sensors for measuring both torque and temperature.

2. The Prior Art

Applicant's own earlier British Patent no. 2381069 discloses a SAW sensor for the contactless measurement of torque on a rotating shaft comprising two SAW devices mounted on a single substrate made of Y+34° cut quartz, one of them oriented at +45° to X axis of the substrate and another one oriented at −45° to the X axis. The difference between the signals obtained from the two SAW devices (the resonant frequency difference $F_M = f_1 - f_2$ if the two devices are resonators or the phase delay difference if the two devices are reflective delay lines) is then proportional to torque, and differential measurement allows partial compensation of aging effect and influence of temperature and the rotational error introduced by an RF rotary coupler. The use of the Y+34° cut of quartz and the SAW devices being oriented at 45° to the X axis gives a high value of torque sensitivity, reduced variation of torque sensitivity with temperature, and reduced variation of resonant frequencies with temperature.

This prior art system therefore simplifies, to a certain extent, temperature compensation of the torque reading but does not completely eliminate the need for the compensation. Indeed, typical variation of the sensitivity of the torque sensor attached to a steel shaft is around 1-2% within the temperature range from −30° to +90° C. Moreover the frequency difference $F_M$ at zero torque (zero offset $F_0$) also varies with temperature due to the fact that the two SAW devices are not absolutely identical by about 8-10% of full scale. As a result, in order to achieve a high accuracy of torque measurements we need to measure the temperature as well and then use calibration information to perform compensation. Temperature measurements are typically therefore done by an external semiconductor, thermoresistor or thermocouple sensor attached to a place in a close proximity to the torque sensor. However these devices must inevitably be spaced apart from the SAW substrate, thereby imposing a limit on the accuracy of the temperature reading for the substrate which can be taken.

GB 2386684 discloses a SAW based pressure sensor having 3 SAW devices mounted on a single substrate so as to enable both pressure and temperature readings to be taken. One of the SAW resonators, PSAW, is mounted on a portion of the substrate which is subjected to strain variations due to changes in pressure whilst the other two are mounted on unstrained regions of the substrate. By using three resonators, two frequency differentials can be calculated: $F_p$—the difference between the resonant frequencies of PSAW and one of the unstrained SAWs that is parallel to PSAW (T1SAW), which figure depends predominantly on pressure only (temperature compensation of $F_p$ is achieved by means of differential measurement). The third resonator (T2SAW) is at an angle to T1SAW and PSAW so its temperature characteristic differs from that of T1SAW due to the substrate anisotropy. As a result, the difference $F_t$ of resonant frequencies of T1SAW and T2SAW depends only on temperature thus allowing easy calculation of temperature from the measured value of $F_t$.

SUMMARY OF THE INVENTION

According to the present invention there is provided a contactless SAW based torque and temperature sensor comprising a first and a second SAW resonator provided on a substrate made of Y+34° cut of quartz, said first SAW having its principle axis inclined at +45° to the X-axis of the substrate, which, in use, is either aligned with the longitudinal axis of the device whose torque is to be measured or is perpendicular thereto, and said second SAW having its principle axis inclined at 135° (−45°) to the X-axis of the substrate, and further comprising a third SAW having its principle axis inclined at an angle to the principle axis of both the first and second resonators.

A sensor in accordance with the invention has the advantage that it provides a passive wireless sensor which provides information to enable calculation of both torque and local temperature in a particularly accurate manner that will not be affected by aging or rotational errors introduced by an RF rotary coupler.

In one embodiment, all three SAWs are mounted on a single substrate. In an alternative arrangement, however, the first and second SAWs are provided on a first, common substrate and the third SAW is provided on a second, separately formed substrate, which is packaged in a single package with the first substrate. The second substrate may have its $X_{2(i)}$-axis aligned with the $X_1$ of the first substrate or arranged at 90° to it $X_{2(ii)}$, and the second substrate is preferably formed of a piezoelectric material, in particular having a linear temperature coefficient of frequency substantially in the range of 10 to 25 ppm/°C. It is particularly advantageous for the second substrate to be formed using quartz, and Y-cut and rotated Y-cuts of quartz up to Y+25° are especially preferred.

The third SAW is preferably inclined at an angle α to the X-axis of the or each substrate where α is substantially in the range $0 \leq \alpha \leq 30°$, and preferably less than 30°.

In a further advantageous development, the sensor includes a fourth SAW resonator which is inclined at an equal but opposite angle to the angle of inclination of the third SAW, in particular said third and fourth SAWs being arranged symmetrically relative to the X axis of the substrate. Both the third and fourth SAWs are then used to provide temperature information. Preferably, the third and fourth SAWs are inclined at +α° and −α° respectively to the X axis of the substrate and are provided on a common substrate which may be formed separately from the substrate carrying the first and second SAWs but is preferably integrally formed therewith.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE PREFERRED EMBODIMENT

Figure 1:
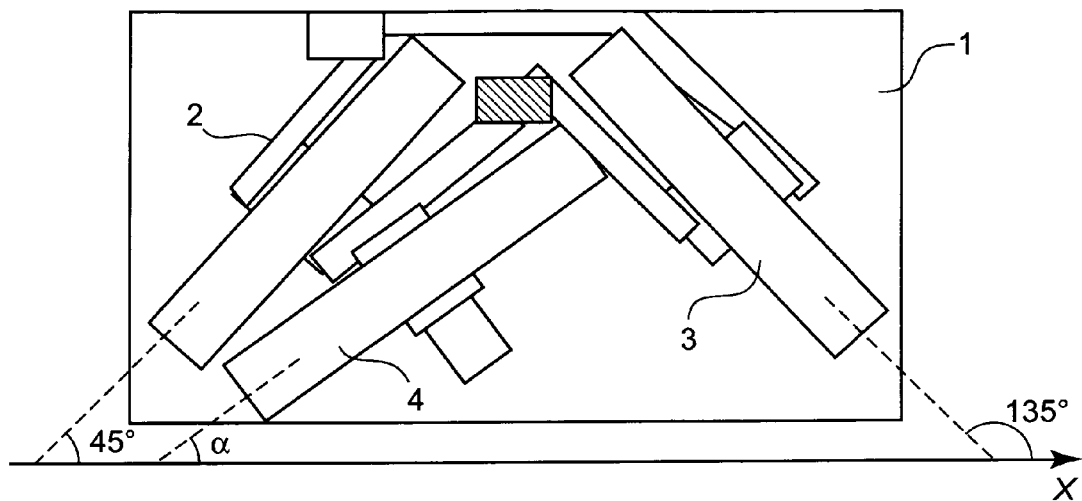
FIG. 1 is a schematic diagram of a torque and temperature sensor according to a first embodiment of the invention.

Referring first to FIG. 1, there is shown a diagrammatic illustration of a sensor according to a first embodiment of the invention. The sensor comprises a substrate 1 is made of Y+34° cut quartz on which are formed a first SAW resonator M1SAW 2 and a second SAW resonator M2SAW 3, the resonators being made at such an angle to X axis of the substrate that they propagate at +45 degrees and 135 to the X axis respectively, that is the principle axes of the two SAWs are inclined at +45° and −45° to the X axis respectively. This provides minimum variation of their resonant frequencies $f_2$ and $f_1$ with temperature T, maximum sensitivity of $F_M = f_1 - f_2$ to torque M and small variation of this sensitivity with temperature. A third resonator TSAW 4 is fabricated on the same substrate at such an angle to the X axis that the SAW in that resonator propagates at an angle $\alpha$ to the X axis (where $\alpha$ does not equal ±45 degrees so that none of the SAWs are parallel to each other. All three resonators are electrically connected either in series or in parallel by means of either conducting tracks on the substrate or by bond wires. As an example, resonant frequencies can be selected as follows: for M1SAW $f_1 = 437$ MHz, for M2SAW $f_2 = 435$ MHz and for TSAW $f_3 = 433$ MHz.

The substrate 1, in use, is attached to the surface of a shaft or the like whose torque is to be measured, this torque giving rise to a biaxial strain field as opposed to the uniaxial strain field developed in pressure monitoring applications, which biaxial strain field (principal components of strain are tension and compression strain along ±45° to the X axis of the substrate) is transmitted to the substrate so that all three resonators are strained.

Selection of the angle $\alpha$ depends on a desired temperature measurement range and a desired temperature sensitivity of the difference frequency $F_T = f_2 - f_3$ where $f_3$ is the resonant frequency of TSAW 4. It is also determined by the requirement to have a sufficiently large value of reflection coefficient of SAW from the strips in the reflecting gratings of TSAW. The angle $\alpha$ can be within the range from 0 to approximately 30°.

Figure 2:
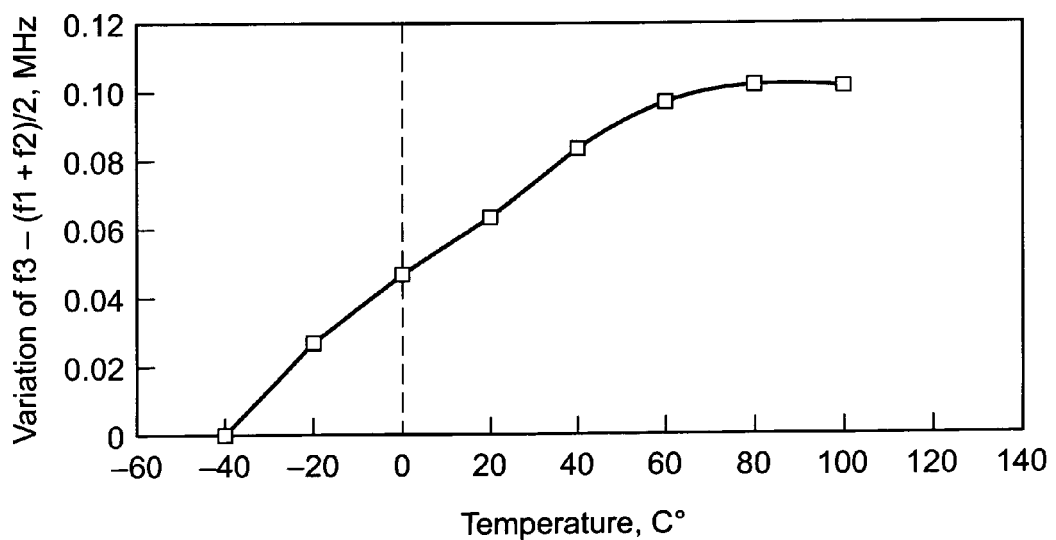
FIG. 2 is a graph showing the variation of frequency difference with temperature for the sensor according to FIG. 1.

For instance if $\alpha = 0$ then the sensitivity to temperature is the lowest one. On the other hand this configuration has an advantage of TSAW being insensitive to torque. In this case it makes sense to measure the difference $F_T' = f_3 - (f_1 + f_2)/2$ which will depend only on temperature. Independence of this difference from torque simplifies calculation of T from the measured value of $F_T'$. Variation of $F_T'$ with temperature for this configuration is shown in FIG. 2. As one can see the temperature sensitivity is only around 1 kHz/°C. and unambiguous temperature measurement is possible only up to 60° C.

Figure 3:
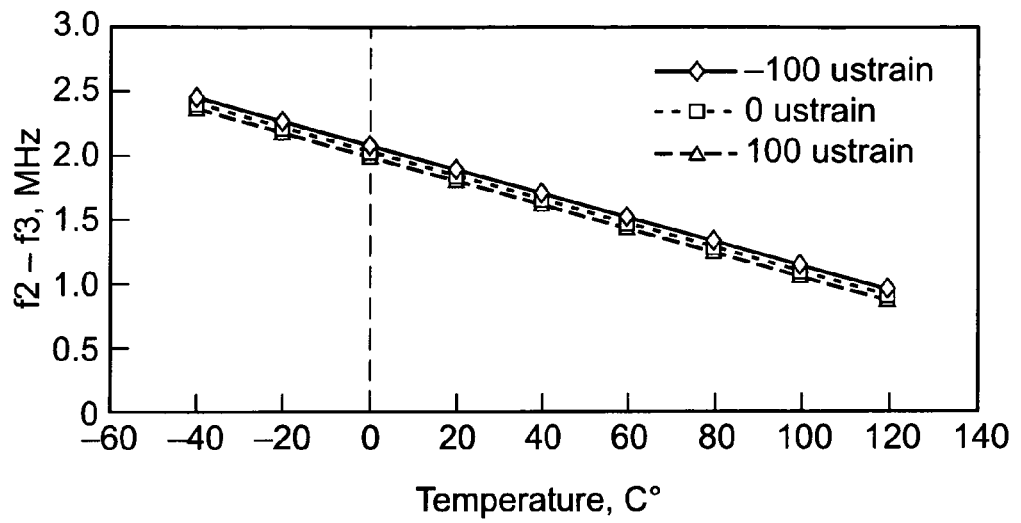
FIG. 3 is a graph showing the variation of frequency difference with temperature for different values of principle component of strain for the sensor of FIG. 1.

In the case of $\alpha = 30°$ the sensitivity of $F_T$ to temperature is maximal however it will also depend on torque. Approximate variation of $F_T$ with temperature for three different values of the principal component of strain on the substrate surface is shown in FIG. 3.

It can be seen that the range of unambiguous temperature measurement is at least from −40° to +120° C. The characteristic is very linear and the temperature sensitivity is around 9 kHz/° C.

A disadvantage of the angles $\alpha \neq 0$ is that $F_T$ depends not only on temperature but also on torque. However it is still possible to calculate both torque M and temperature T from the measured values $F_M$ and $F_T$. One of possible algorithms of calculation is outlined below.

The two frequency differences can be approximated by the equations:

$$F_M = S(T)M + F_0(T),$$

$$F_T = a_1 + a_2T + a_3M + a_4MT$$

where S(T) is the torque sensitivity depending in an arbitrary manner on temperature and $F_0(T)$ is the torque characteristic offset (zero) also depending in an arbitrary manner on temperature. They can be stored in a calibration look-up table. Calibration coefficients $a_{1-4}$ are just constants that may characterise each sensor individually or may be the same for all sensors.

Calculation of M and T can be performed by means of iterations:

1. Assume that T=T', either the temperature value measured during the previous interrogation cycle or the value read from an external semiconductor temperature sensor.
2. Find the first approximation of torque: $M' = [F_M - F_0(T')]/S(T')$.
3. Calculate a corrected temperature value:

$$T = (F_T - a_1 - a_3M')/(a_2 + a_4M').$$

4. Calculate a corrected torque value: $M = [F_M - F_0(T)]/S(T)$.

If needed iterations can be continued to improve accuracy of calculated values of T and M.

Figure 4:
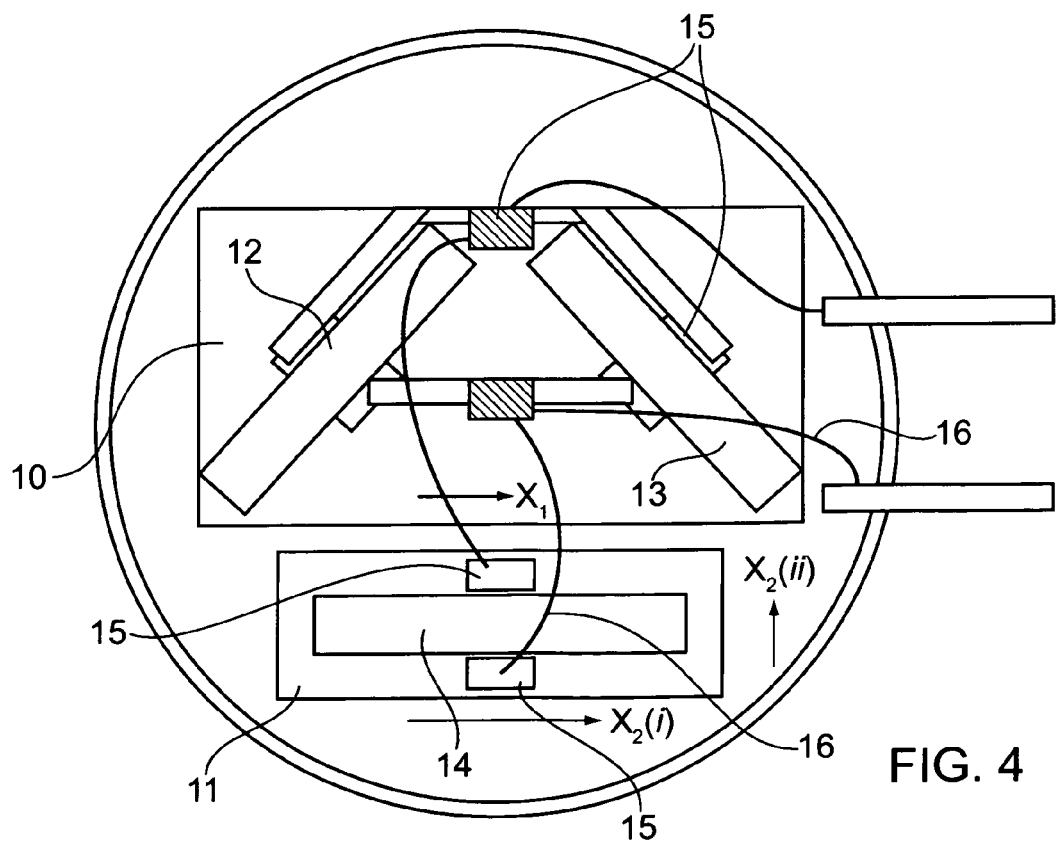
FIG. 4 is a schematic diagram of a torque and temperature sensor according to a second embodiment of the invention.

In the embodiment of FIG. 1, all three SAWs are mounted on a common substrate. However, it will be understood that this is not essential, and FIG. 4 illustrates a second embodiment in which the sensor is composed of two separate substrates 10, 11. First and second SAW resonators M1SAW 12 and M2SAW 13 are fabricated on the first substrate 10 made of Y+34° cut quartz, which substrate 10 is rigidly attached to the base of the package and the package base is rigidly attached to the shaft or another part (not shown) in order to transfer strain from the shaft surface to the surface of the substrate without significant loss. The X-axis of the substrate 10 is aligned parallel to the shaft axis in this example. The substrate can also be directly attached to the surface of the shaft.

Figure 5:
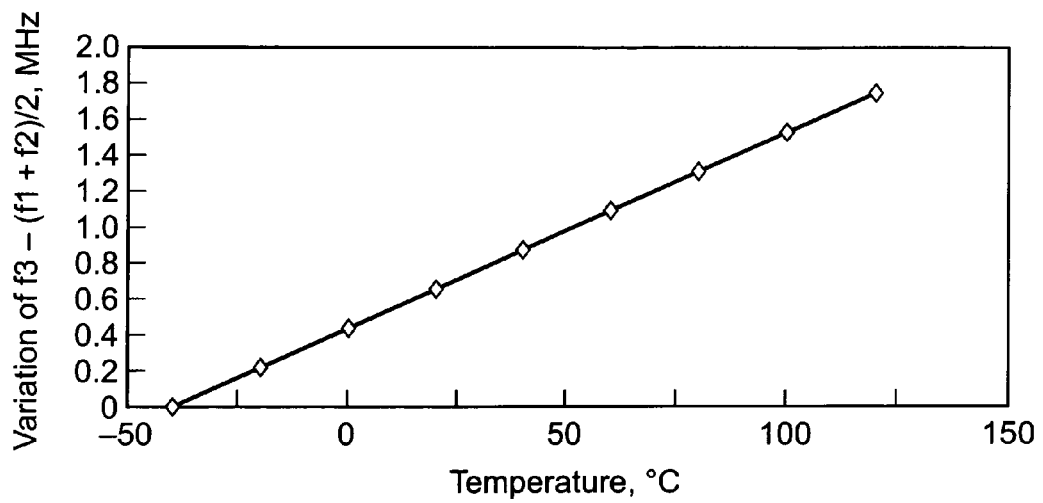
FIG. 5 is a graph showing a further frequency/temperature characteristic.

A third resonator TSAW 14 for temperature measurements is fabricated on the second, separately formed substrate 11 which is made of any piezoelectric material with an appropriate value of the linear temperature coefficient of frequency around 10 to 25 ppm/°C. Preferably it should be quartz with the resonator orientation along the X axis. Required temperature coefficients of frequency can be obtained using Y-cut and rotated Y cuts up to Y+25° cut. For instance, if the substrate is made of Y-cut quartz then the resulting variation of $F_T' = f_3 - (f_1 + f_2)/2$ with temperature is shown in FIG. 5. The resulting characteristic is very linear and the temperature sensitivity is high, around 11 kHz/°C. The substrate 11 for the third resonator TSAW 14 is attached to the base of the torque sensor package (or directly to the shaft) by means of a soft adhesive in order to completely eliminate straining of the substrate 11. The TSAW 14 die can also be attached to the lid of the torque package so that it is positioned on top of the torque sensing die. This embodiment will allow reducing the area of the sensor base.

All three resonators are electrically connected either in series or in parallel within the package by conducting tracks 15 and bond wires 16 as shown in FIG. 4 for example. An important advantage of this embodiment is that $F_T'$ does not depend on torque at all and thus calculation of T from the measured value of $F_T'$ is very simple. It will require less calibration data. A disadvantage of this embodiment compared to the previous one is that the sensor is more complex and expensive.

Figure 6:
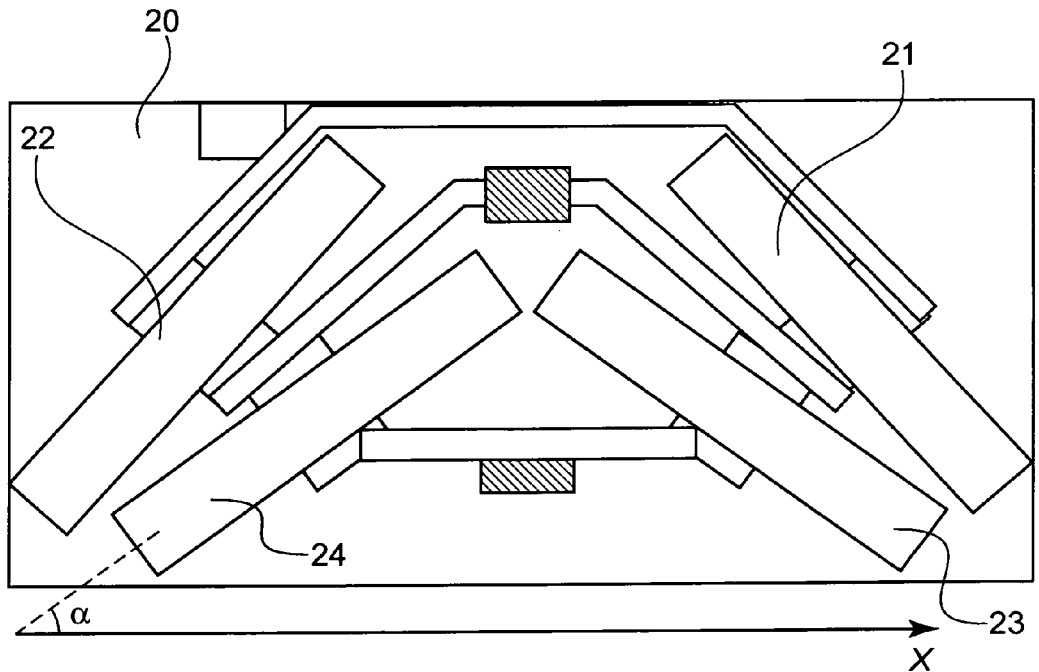
FIG. 6 is a schematic diagram of a torque and temperature sensor according to a third embodiment of the invention.

A third embodiment of the invention is illustrated in FIG. 6, which overcomes the problem of $F_T$ being dependent of torque if $\alpha \neq 0$ which arose with the previous embodiment.

In this embodiment, the sensor made on a single Y+34° cut quartz substrate 20, but in different to the previous embodiments, in addition to two torque sensing elements M1SAW 21 and M2SAW 22 positioned at ±45° to the X axis, two temperature sensing elements—T1SAW 23 and T2SAW 24, are provided positioned symmetrically relative to the X axis of the substrate at equal but opposite angles and having resonant frequencies $f_4$ and $f_3$. The first temperature element 23 has a SAW propagation direction at $-\alpha$ degrees. to the X-axis, the second one 24 has a SAW propagation direction at $+\alpha$. degrees to the X-axis. The angle $\alpha$ is selected to give desirable temperature sensitivity and sufficiently large SAW reflection from the strips in the gratings.

$F_M = f_1 - f_2$ is measured depending predominantly on torque and $F_T'' = f_1 + f_2 - f_3 - f_4$ depending only on temperature. Using measured value of $F_T''$ one can easily calculate temperature. Furthermore, $F_M' = f_3 - f_4$ can be measured that will depend predominantly on torque although with a smaller torque sensitivity. As a result torque can also be calculated from the value $F_M'$ giving us a redundancy that increases reliability of torque measurements.

A disadvantage of this embodiment is an increased die area, sensor interrogation time and wider frequency range occupied by the sensor.

The invention claimed is:

1. A contactless SAW based torque and temperature sensor system comprising:
    a substrate made of Y+34° cut of quartz having an $X_1$-axis;
    a first torque SAW resonator and a second torque SAW resonator mounted on said substrate, said first SAW having its principle axis inclined at +45° to the X-axis of the substrate, which, in use, is either aligned with the longitudinal axis of the device whose torque is to be measured or is perpendicular thereto, and said second SAW having its principle axis inclined at 135° to the X-axis of the substrate; and
    a third temperature SAW resonator having its principle axis inclined at an angle $\alpha$ to the X-axis of the substrate where $\alpha$ is substantially in the range $0<\alpha<30$ degrees.

2. The system of claim 1, wherein the third SAW has its principle axis inclined at an angle $\alpha$ of 30 degrees to the X-axis of the substrate.

3. The system of claim 1, where said first, second and third SAWs are all mounted on a common substrate and wherein the selection of angle $\alpha$ determines temperature sensitivity, from an angle $\alpha=0$ where sensitivity to temperature is lowest to an angle $\alpha=30$ where sensitivity to temperature is maximal.

4. The system of claim 1, further comprising a second substrate having an $X_2$ axis, wherein the first and second SAWs are provided on a first, common substrate and the third SAW is provided on the second, separately formed substrate which is packaged in a single package with the first substrate.

5. The system of claim 4, wherein the second substrate has its $X_2(i)$ axis is arranged at 90 degrees to the $X_1$ of the first substrate.

6. The system of claim 4, wherein the second substrate has its $X_2(ii)$ axis arranged at 90 degrees to the $X_1$ axis of the first substrate.

7. The system of claim 4, wherein the second substrate is formed from a piezoelectric material.

8. The system of claim 4, wherein the second substrate has a linear temperature coefficient of frequency substantially in the range of 10 to 25 ppm/° C.

9. The system of claim 4, wherein the second substrate is formed from quartz.

10. The system of claim 4, wherein the second substrate is formed from one of Y-cut or rotated Y-cuts of quartz up to Y+25°.

11. The system of claim 1, further comprising:
    a fourth SAW resonator which is inclined at an equal but opposite angle to the angle of inclination of the third SAW, said third and fourth SAWs being used to provide temperature information.

12. The system of claim 11, wherein said third and fourth SAWs are arranged symmetrically relative to the X-axis of the substrate.

13. The system of claim 12, wherein the third and fourth SAWs are inclined at $+\alpha°$ and $-\alpha°$ respectively to the X-axis of the substrate.

14. The system of claim 13, wherein the third and fourth SAWs are provided on a common substrate.

15. The system of claim 14, wherein the common substrate on which said third and fourth SAWs are formed is integrally formed with the substrate carrying the first and second SAWs.

* * * * *

UNITED STATES PATENT AND TRADEMARK OFFICE
CERTIFICATE OF CORRECTION

PATENT NO. : 7,795,779 B2
APPLICATION NO. : 11/920678
DATED : September 14, 2010
INVENTOR(S) : Victor Alexandrovich Kalinin It is certified that error appears in the above-identified patent and that said Letters Patent is hereby corrected as shown below:

Column 2, line 3, delete "$F_p$" and insert --$F_t$--;

Claim 1, line 14, following "range" delete "$0<\alpha<30$" and insert --$0\leq\alpha\leq30$--; and Claim 5, line 2, after "axis" delete "is" and after "X1" insert --axis--.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

PATENT NO.      : 7,795,779 B2                                Page 1 of 1
APPLICATION NO. : 11/920678
DATED           : September 14, 2010
INVENTOR(S)     : Victor Alexandrovich Kalinin It is certified that error appears in the above-identified patent and that said Letters Patent is hereby corrected as shown below:

Column 2, line 3, delete "$F_p$" and insert --$F_t$--;

(Claim 1, line 14), following "range" delete "$0<\alpha<30$" and insert --$0\leq\alpha\leq30$--; and (Claim 5, line 2), after "axis" delete "is" and after "X1" insert --axis--.

This certificate supersedes the Certificate of Correction issued November 2, 2010.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

PATENT NO.        : 7,795,779 B2
APPLICATION NO.   : 11/920678
DATED             : September 14, 2010
INVENTOR(S)       : Victor Alexandrovich Kalinin It is certified that error appears in the above-identified patent and that said Letters Patent is hereby corrected as shown below:

Column 2, line 3, delete "$F_p$" and insert --$F_t$--;

Column 6, line 3 (Claim 1, line 14), following "range" delete "$0<\alpha<30$" and insert --$0\leq\alpha\leq30$--; and Column 6, line 22 (Claim 5, line 2), after "axis" delete "is" and after "X1" insert --axis--.

This certificate supersedes the Certificates of Correction issued November 2, 2010 and December 7, 2010.

Signed and Sealed this
Twenty-fifth Day of January, 2011

David J. Kappos
*Director of the United States Patent and Trademark Office*